United States Patent

Livshits

[11] Patent Number: 6,139,714
[45] Date of Patent: Oct. 31, 2000

[54] METHOD AND APPARATUS FOR ADJUSTING THE PH OF A LIQUID

[75] Inventor: David Livshits, Ashdad, Israel

[73] Assignee: Gemma Industrial Ecology Ltd., Brooklyn, N.Y.

[21] Appl. No.: 08/982,700

[22] Filed: Dec. 2, 1997

[51] Int. Cl.[7] .................................................. C02F 1/461
[52] U.S. Cl. ..................... 205/516; 205/746; 204/527; 204/541; 204/263
[58] Field of Search ................... 204/527, 541, 204/263; 205/516, 703, 746

[56] References Cited

U.S. PATENT DOCUMENTS

| Re. 28,203 | 10/1974 | Schulz . |
| 3,318,788 | 5/1967 | Mintz . |
| 3,616,385 | 10/1971 | Kloss et al. . |
| 3,669,857 | 6/1972 | Kirkham et al. . |
| 4,284,492 | 8/1981 | Karn . |
| 4,317,841 | 3/1982 | Brambilla et al. . |
| 4,374,714 | 2/1983 | Hekal ....................................... 204/541 |
| 4,391,680 | 7/1983 | Mani et al. . |
| 4,536,269 | 8/1985 | Chlanda et al. . |
| 4,740,281 | 4/1988 | Chlanda et al. . |
| 4,767,511 | 8/1988 | Aragon ..................................... 205/516 |
| 4,857,343 | 8/1989 | Hekal ...................................... 204/522 |
| 4,871,431 | 10/1989 | Parsi . |
| 4,880,513 | 11/1989 | Davis et al. . |
| 4,936,962 | 6/1990 | Hatzidimitriu . |
| 5,034,110 | 7/1991 | Glore et al. . |
| 5,200,046 | 4/1993 | Chlanda et al. . |
| 5,227,040 | 7/1993 | Simons . |
| 5,308,455 | 5/1994 | Bourgeois . |
| 5,407,547 | 4/1995 | Landfors et al. . |
| 5,536,385 | 7/1996 | Sheldon et al. . |
| 5,578,182 | 11/1996 | Nobel et al. . |
| 5,858,202 | 1/1999 | Nakamura . |
| 5,993,639 | 11/1999 | Miyashita et al. . |

Primary Examiner—Arun S. Phasge
Attorney, Agent, or Firm—R. Neil Sudol; Henry D. Coleman

[57] ABSTRACT

A process for adjusting the pH of an aqueous flowable fluid includes an electrochemical mechanism for adjusting the pH of an aqueous flowable fluid and a mechanism for then electrochemically stabilizing the adjusted pH of the fluid. A device for performing the process is also included. The device includes an inlet and a channel in fluid communication with the inlet. The channel has the appearance and properties of a U-shaped connected vessel. The U-shaped connected vessel includes an inlet accumulating passage in fluid communication with an active zone between two spaced electrodes wherein the active zone has a small volume relative to the passage for accelerating fluid flow from the passage through the active zone complying with the physics of connected vessels.

50 Claims, 8 Drawing Sheets

METHOD AND APPARATUS FOR ADJUSTING THE PH OF A LIQUID

TECHNICAL FIELD

The present invention relates to a method and apparatus for increasing or decreasing the acidity of a flowable fluid.

BACKGROUND OF THE INVENTION

Various systems have been used in the preliminary treatment of fluids in industrial and agricultural processes for adjusting pH. Such systems have been used as a preliminary treatment of industrial rinsing water, systems of industrial waste water treatment in various production processes, and in agriculture technologies, such as watering, stock breeding, and water supply utilities. Many such processes utilize chemical reagents resulting great inconvenience in operation and large amounts of solid deposit as a result of the acidity change. Also noted have been inaccuracy in predicting and obtaining acidity values.

Alternatively, electrochemical systems have been used. These systems generally include the steps of flowing a liquid through inter-electrode spaces, defining cathodic and anodic zones by means of a membrane and running a current connection to the zones to effect a pH exchange upon the liquid. Examples of such a system is disclosed in the U.S. Pat. No. 4,936,962 to Hatzidimitriu issued Jun. 26, 1990. The Hatzidimitiu system provides a process to adjust the acidity of a flowable fluid by electrodialysis in a cell containing membrane pairs comprising a biopolar membrane and an ion selective membrane. The U.S. Pat. No. 4,391,680 to Mani et al, issued Jul. 5, 1983 discloses a two-compartment water splitter having alternating cation and bipolar membranes used to remove alkali metal cations from an aqueous alkali metal chloride solution to produce an acidified salt solution. U.S. Pat. No. 4,284,492 to Karn, issued Aug. 18, 1991 discloses a reverse osmosis electrodialysis assembly having osmotice membranes of anionic-cationic bilaminate ion-exchange composition and having electrodes supplying electrical current which effect water-splitting at the membrane surfaces to produce acidity in an osmotic feed stream to prevent salt precipitation. Various other patents have issued relating to the use of two compartment or multi-compartment electrodialtic water-splitters and methods of using the same.

A problem has arisen because there is a lack of stability in the electrolitically produced fluid having the adjusted pH resulting from processing. Also, prior art systems have low efficiency due to the high power consumption, non-uniformity of acidity change over a whole volume, destruction of liquid in the zone of electrode location, low accuracy of acid change, and inadequate ecological reliability of the process.

It is therefore desirable to develop an electrolitic system for adjusting the pH of an aqueous flowable fluid having an increased efficiency level of the process of acidity change, reduction of specific power consumption for the process of acidity change, increase in ecological purity of the process, and an increase of accuracy level of the acidity change process.

SUMMARY OF THE INVENTION

In the accordance with the present invention, there is provided a process for adjusting the pH of an aqueous flowable fluid by electrochemically adjusting the pH of an aqueous flowable fluid and then electrochemically stabilizing the adjusted pH of the fluid. The present invention further provides a process for adjusting the pH of an aqueous flowable fluid by supplying a fluid through a channel having the appearance and properties of a U-shaped connected vessel and dividing the fluid into two branches including an inlet accumulating passage leading to an action zone between two electodes wherein the action zone has a smaller volume relative to the inlet accumulating passage and accelerating the fluid flow from the inlet accumulating passage through the action zone complying with the physics of connected vessels.

The present invention further provides a device for adjusting the pH of an aqueous flowable fluid, the device including electrochemical adjusting means for adjusting the pH of the fluid and electrochemical stabilizing means for chemically stabilizing the adjusted pH of the fluid.

The present invention also provides a device for adjusting the pH of an aqueous flowable fluid, the device including an inlet and a channel in fluid communication with the inlet. The channel has the appearance and properties of a U-shaped connected vessel. The U-shaped connected vessel includes an inlet accumulating passage in fluid communication with an action zone between two spaced electrodes. The action zone has a small volume relative to the passage for accelerating fluid flow from the passage through the action zone complying with the physics of connected vessels.

BRIEF DESCRIPTION OF THE FIGURES

Other advantages of the present invention will be readily appreciated as the same becomes between understood by reference to the following detailed description when considered in connection with the accompanying drawings wherein:

FIG. 6a is a side view of the assembly;

FIG. 6b is an enlarged cross-sectional view of an aerosol and gas filter;

DESCRIPTION OF THE INVENTION

A device made in accordance with the present invention is generally shown at 10 in the figures. The device is an assembly for adjusting the pH of an aqueous flowable fluid. That is, the device is capable of in taking a fluid, such as liquids and solutions and adjust the pH thereof to a desirable level. This is accomplished by an electrode dialysis or a electrochemical method.

Most generally, the present invention provides a device including an electrochemical adjusting mechanism for adjusting the pH of a fluid in combination with a mechanism for stabilizing the adjusted pH of the fluid. Moreover, the device utilizes a channel in fluid communication with an inlet, the channel having the appearance and properties of a U-shaped connected vessel. The U-shaped connected vessel include an inlet accumulating passage in fluid communication with an action zone between two spaced electrodes wherein the action zone has a smaller volume relative to the passage for accelerating fluid flow from the passage through the action zone thereby complying with the physics of connected vessels. In this manner, the present invention provides a novel mechanism for producing a stable fluid of a desired pH which is different from the pH of the fluid entering assembly. Moreover, unlike prior art assemblies, there is less power consumption due to the increased efficiency gained by the hydrodynamic effects utilized by the present invention as described in detail below.

Figure 1:
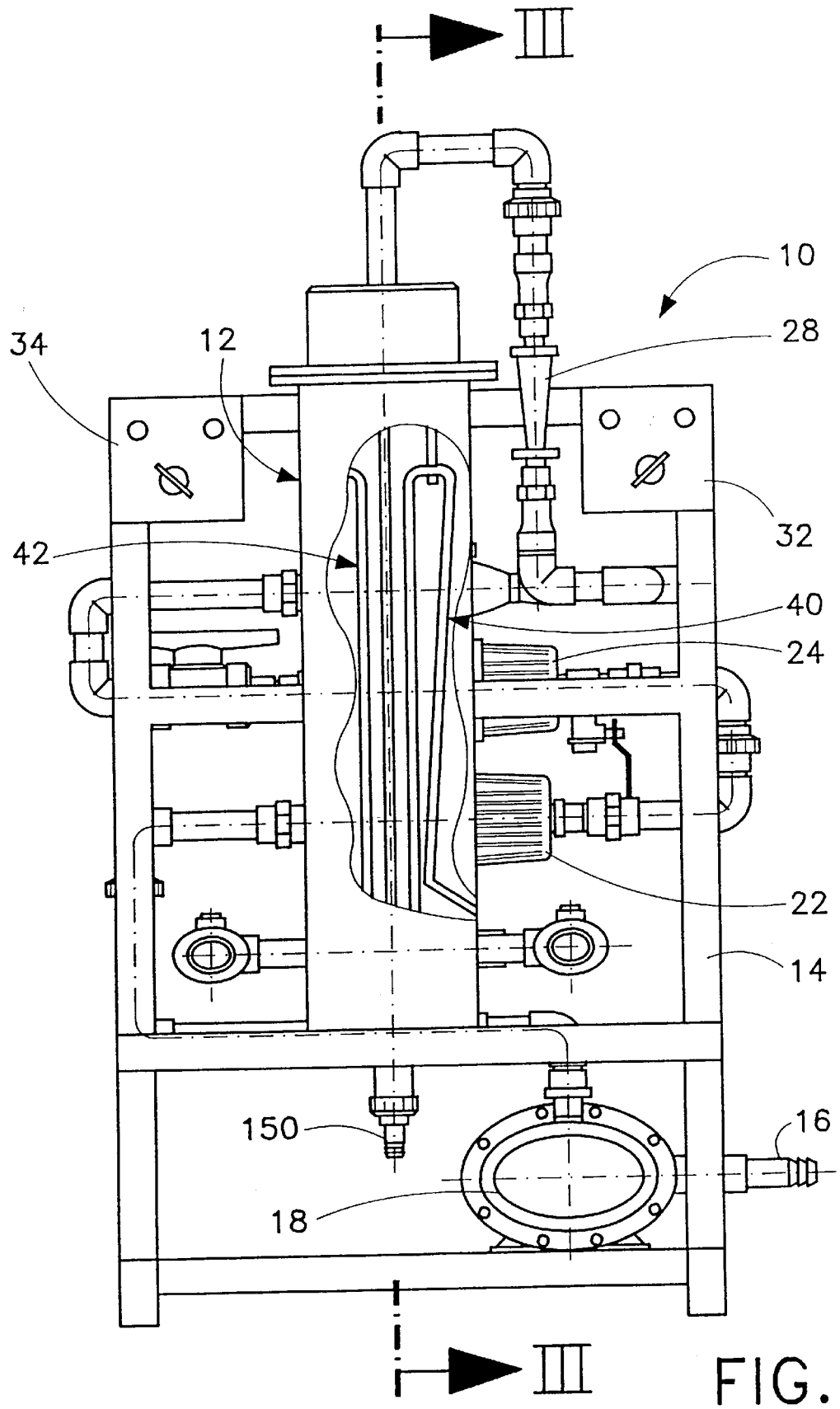
FIG. 1 is elevational view partly broken away of the present invention.

Referring specifically to the frontal view of the device made in accordance with the present invention in FIG. 1, a housing is generally indicated at 12. The assembly is supported within a frame 14. Outside of the housing 12, an inlet 16 from a fluid source is in fluid communication with a pump 18. Preferably, the pump 18 is a centrifugal water pump known to those skilled in the art.

Figure 2:
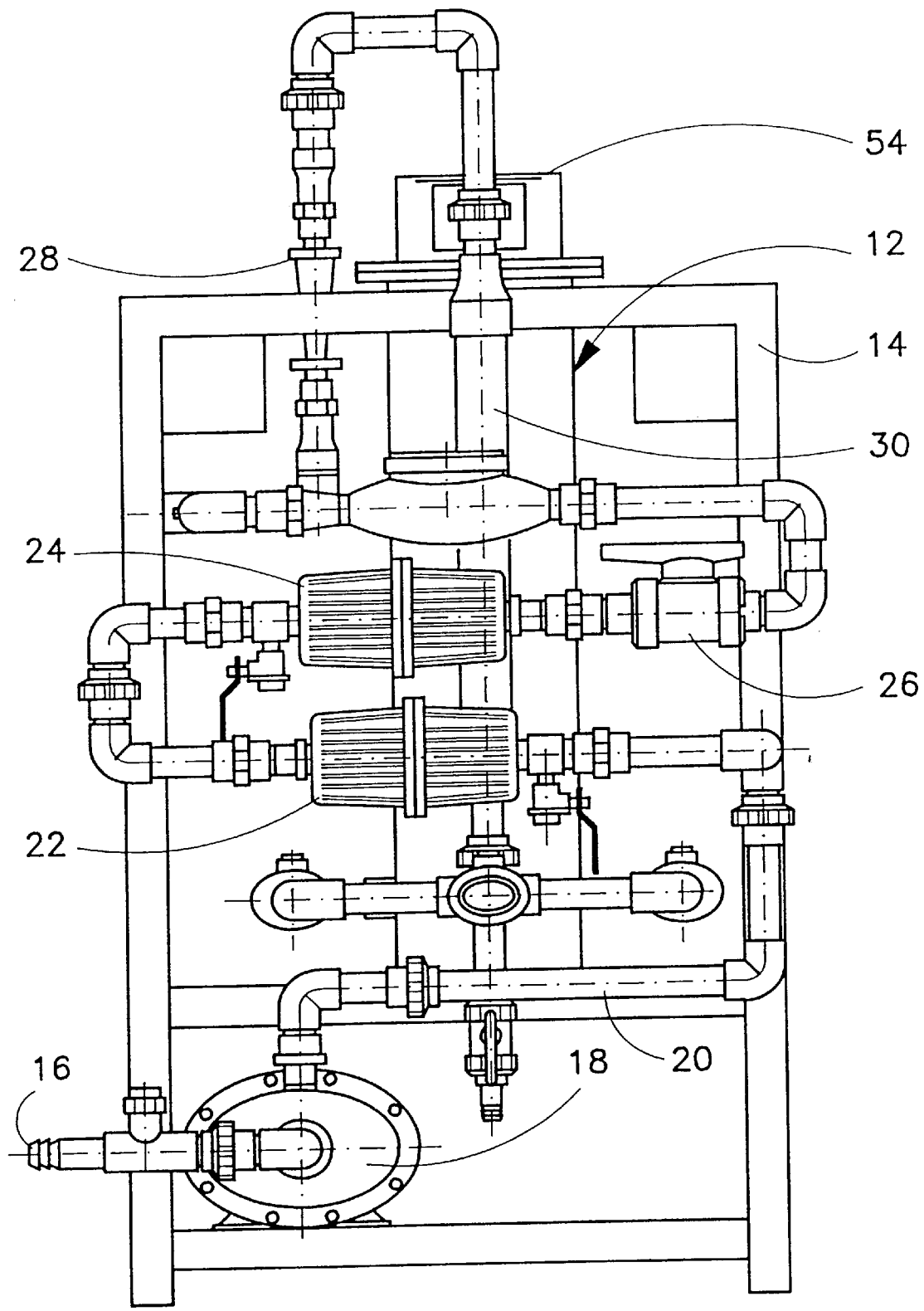
FIG. 2 is a rear elevational view of the invention.

As better shown in the rear-view, FIG. 2, the pump 18 pumps the fluid through piping 20 to two mechanical filters 22, 24. Filters 22, 24 comprise disk elements and are semi-automatic self-cleaning filters know to those skilled in the art. These filters remove particulate matter from the fluid which would otherwise have the potential of clogging the system.

Various regulating valves can be disposed throughout the fluid flow system. For example, regulating valve 26 is added down stream from the mechanical filter 22, 24. The regulating valve 26 controls the amount of liquid inlet flow into the housing 12. It also closes liquid passage through the system for the purpose of cleaning the mechanical filters 22, 24. An inline flow meter 28 is used for the conventional purpose of monitoring flow through the system. It is in fluid communication with the liquid inlet pipe 30. The liquid inlet pipe 30 has a larger cross-section than the down stream piping in order to provide a larger volume of fluid to the entrance of the assembly housing 12.

As best shown in FIG. 1, a control or command unit 32 is mounted on the frame 14. The unit 32 includes a processor, electrical components, and the like well know to those skilled in the art for controlling the automatic operation of the assembly. Various aspects of the assembly can be automated, such as the on/off of the pump 18 as well as electrically controlled valving. As shown in FIGS. 1 and 2, the valving is manually controlled but can also be controlled electrically.

A power supply 34 is also mounted on the frame 14. The power supply 34 provides electrical potential (negative and/or positive) to the electrodes which are described below. Appropriate electrical connections are made between the control unit 32, power supply 34, and the remainder of the unit, as well known in the art.

Figure 3:
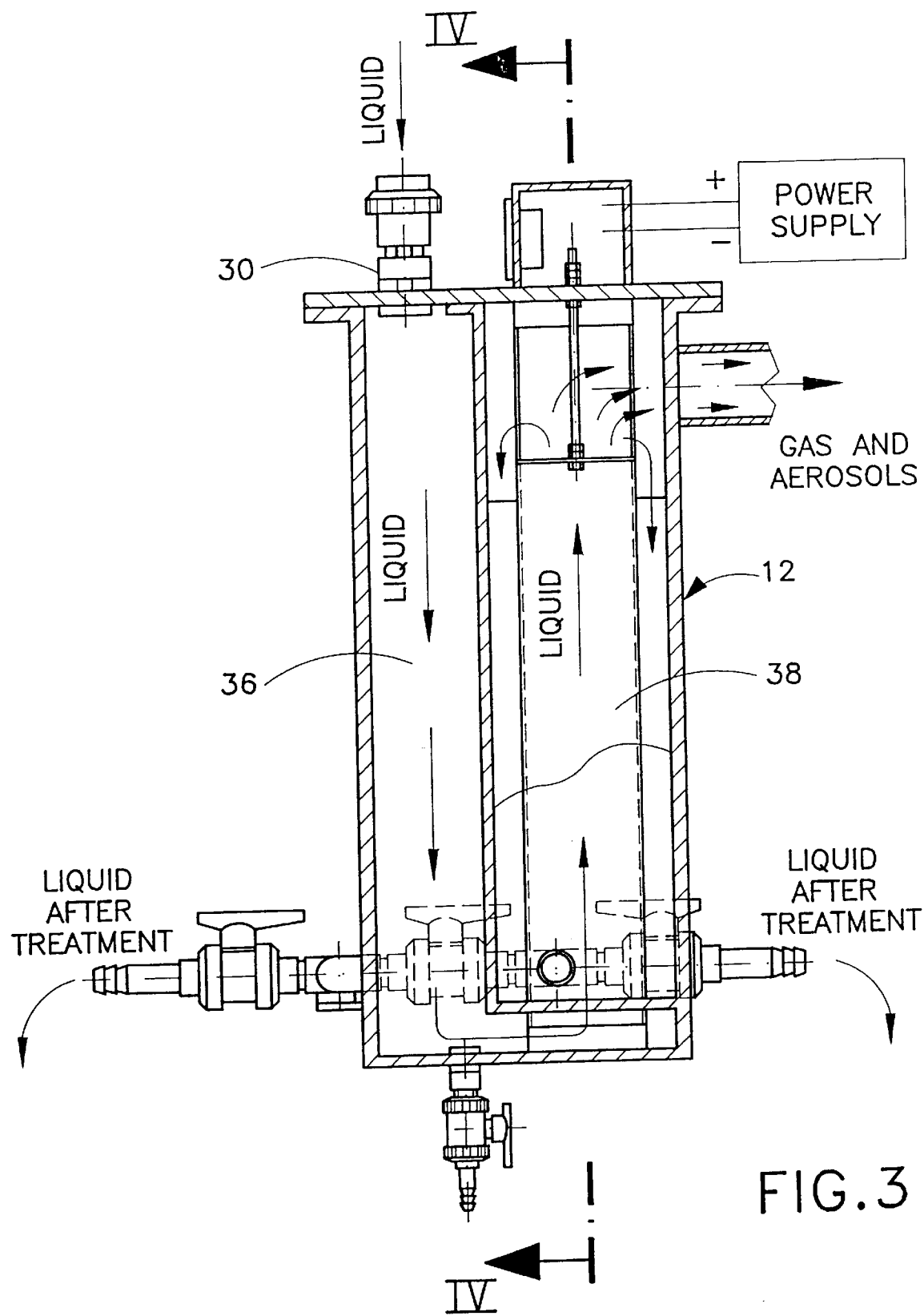
FIG. 3 is cross-sectional view taken substantially along lines D—D of FIG. 1.
Figure 4:
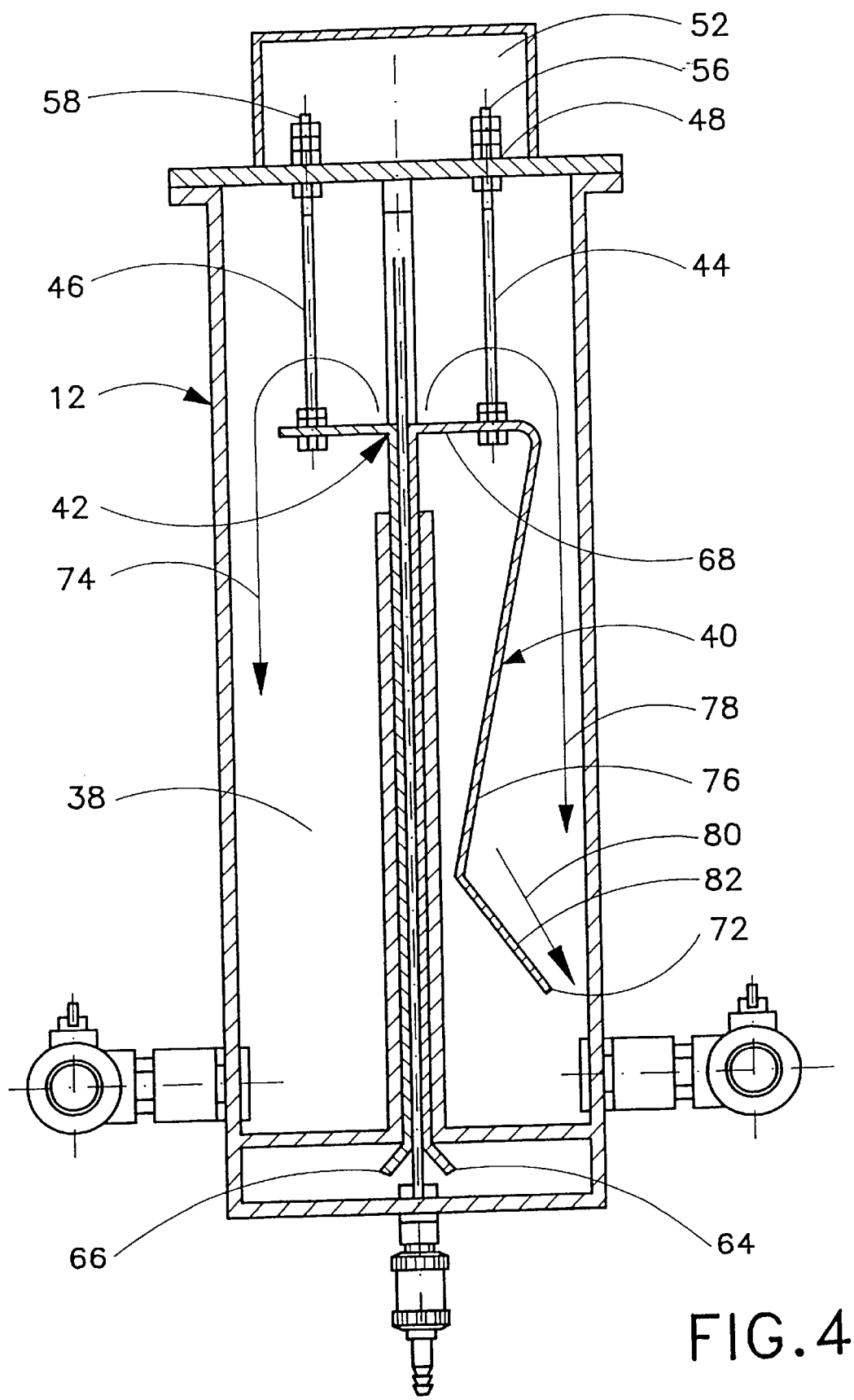
FIG. 4 is a cross-sectional view taken substantially along lines D—D of FIG. 3.
Figure 5:
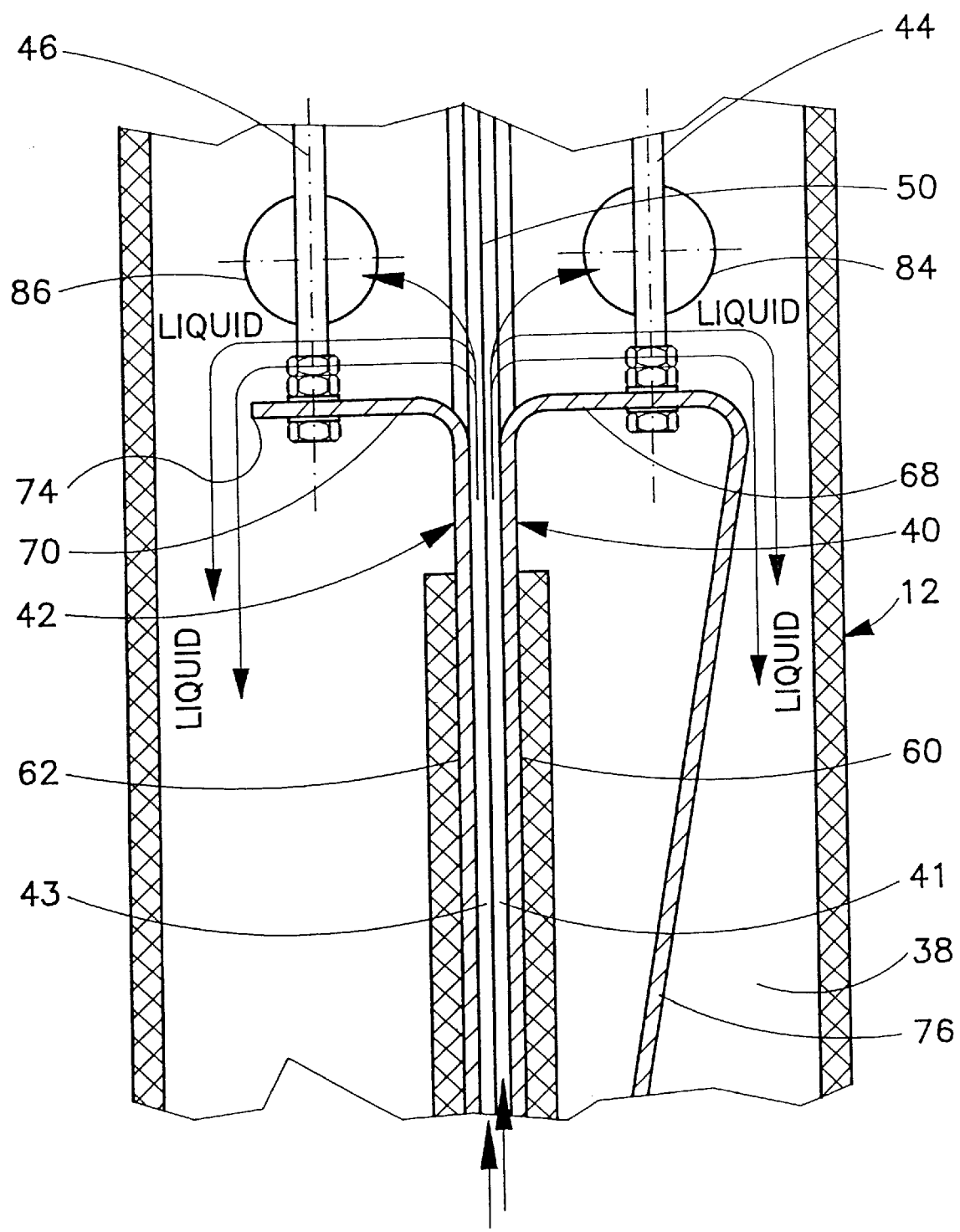
FIG. 5 is an enlarged cross-sectional view of the housing.

FIG. 3 shows a cross-section of the housing 12 taken along lines D—D in FIG. 1. The housing 12 includes an internal channel in fluid communication with inlet 30, the channel having the appearance and properties of a U-shaped connected vessel. The U-shaped connected vessel includes an inlet accumulating passage 36 having a first predetermined volume. Fluid accumulates in this zone prior to entry into the reaction chamber 38. As best shown in FIGS. 4 and 5, the reaction chamber 38 includes two electrodes generally shown at 40, 42 supported by current lead connectors in form of rods 44, 46, respectively to the top plate 48 of the housing 12. Disposed between the electrodes 40, 42 is a semi-permeable membrane 50, which is an electrically neutral membrane 50, such as well known in the art. The membrane 50 disposed between the electrodes 40, 42 defines an action zone therebetween. The membrane 50 divides the action zone into two sub-chambers. The sub-chambers in combination, have a much smaller volume than the inlet accumulating passage 36. Additionally, the inlet passage 36 and sub-chambers, in combination, form a U-shaped connected vessel. Due to the relatively large volume of the inlet passageway 36 relative to the action zone, fluid flowing outwardly through the inlet passage 36 and around and up through the action zone accelerates through the action zone complying with the physics of connected vessels. This hydrodynamic effect greatly increases the efficiency of the system while requiring less energy consumption as compared with prior art assemblies. Hence, this aspect of the invention provides increased efficiency of operation to a significant degree.

As stated above, as the fluid flows through the action zone, the electrodes 40, 42 in combination with the neutral membrane 50 act electrochemically to effectively acidify the fluid adjacent one electrode while produce alkali fluid adjacent the other electrode, on opposite sides of the membrane. That is, the lead connectors 44, 46 each carry an opposite charge from a power source schematically shown at 52 contained within housing case 54 where the rods 44, 46 are connected electrically to the power source at 56, 58 respectively. The charges carried to the respective electrodes 40, 42 create oppositely charged electrodes within the action zone on opposite sides of the membrane 50. The combination of the electrodes 40, 42 and membrane 50 act as an electrodialysis system to effectively split the water, a term utilized in the art. Thusly, the system provides a mechanism for electrochemically adjusting the pH of the fluid flow passing therethrough.

Each of the electrodes 40, 42 includes a vertically disposed portion 60, 62, each including a bent portion 64, 66 proximate to the entrance from the passage 36 to the action zone. The electrodes 40, 42 further include an upper horizontal portion 68, 70, each of which is connected to the power source through the rods 44, 46.

Each of the electrodes 40, 42 includes a peripheral edge 72, 74. The edge provides a stabilizing mechanism over which fluid flows after passing through the action zone. That is, as fluid flows from the action zone over the horizontal surfaces 68, 70 of the electrodes 40, 42, the fluid flows over the edges 72, 74 thereby effecting an edge effect on the fluid having the adjusted pH. The edge effect further stabilizes the changed pH of the fluid. Thusly, as is demonstrated by the experimental evidence set forth below, the pH changed fluid is stabilized for a much greater period of time as compared to chemically or prior art electrochemically modified pH fluids and solutions. Thusly, the present invention provides an increase in efficiency level of acidity change by reducing specific power consumption by utilizing the effect of the U-shaped connected vessel. Also, ecological purity is increased in the process while increasing the process precision without changing and adding other substances to the liquid by utilizing the action zone in combination with the edge effect.

As best shown in FIGS. 4 and 5, at least one of the electrodes 40 can include a substantially downwardly extending additional portion 76 for providing a further stabilizing effect on the pH adjustment. The arrows 78, 80 in FIG. 4 show the fluid flow pattern as the fluid falls from horizontal surface 68 to contact the edge 72 of the active extension 76 of the electrode 40. Either one of the electrodes, the positive or negative, or both electrodes, or neither of the electrodes can be extended.

As best shown in FIG. 4, the additional portion 76 is curved inwardly towards first and second vertical portion 60, 62 of electrodes 40, 42. Thusly, the edge 72 of the extended portion 76 extends outwardly so as to be at the edge of an extended surface 82 which can catch the fluid flow as shown by arrow 80 so that all of the fluid flowing over the horizontal surface 68 of the electrode 40 is caught and then flows over edge 72. Thusly, the further edge effect is ensured to incur.

As best shown in FIG. 5, the flow of the fluid over the horizontal surface 68, 70 of the electrodes 40, 42 brings the fluid in direct contact or direct proximity with the lead connectors 44, 46. The lead connectors 44, 46 are non-insulated and preferably made from the same material as the electrodes 60, 62. Current carried by the lead connectors 44, 46 can effectuate the fluid flowing thereby. It has been found that the lead connectors 44, 46 provide additional power saturation for additionally power saturating the fluid flow thereby further effectuating the pH change and stabilization of the pH change.

Preferably, the lead connectors are streamlined with respect to the fluid flow. Both the electrodes and lead connectors are preferably made from current conducting material insoluble in liquid in which acidity is changed. The extended portion 76 of the electrode 40 is preferably made from chemically more inert material. Examples of such materials are titanium, titanium with platinum coating, titanium with palladium coating, and other materials known in the electrode art.

Preferably, the distance between the working surfaces 60, 62 of the electrodes 40, 42 is equal to one to two millimeters while operating without a membrane and four to six millimeters while operating with a membrane. This allows for acceleration of the fluid flow through the action zone on the vertical elevation between the electrodes 40, 42 to a speed of two meters per second. Additionally, it is preferred that the bottom part 64, 66 of each electrode 40, 42 be made at a angle 30° to 45° relative to the working surface of each of the electrodes.

Figures 6A, 6B:
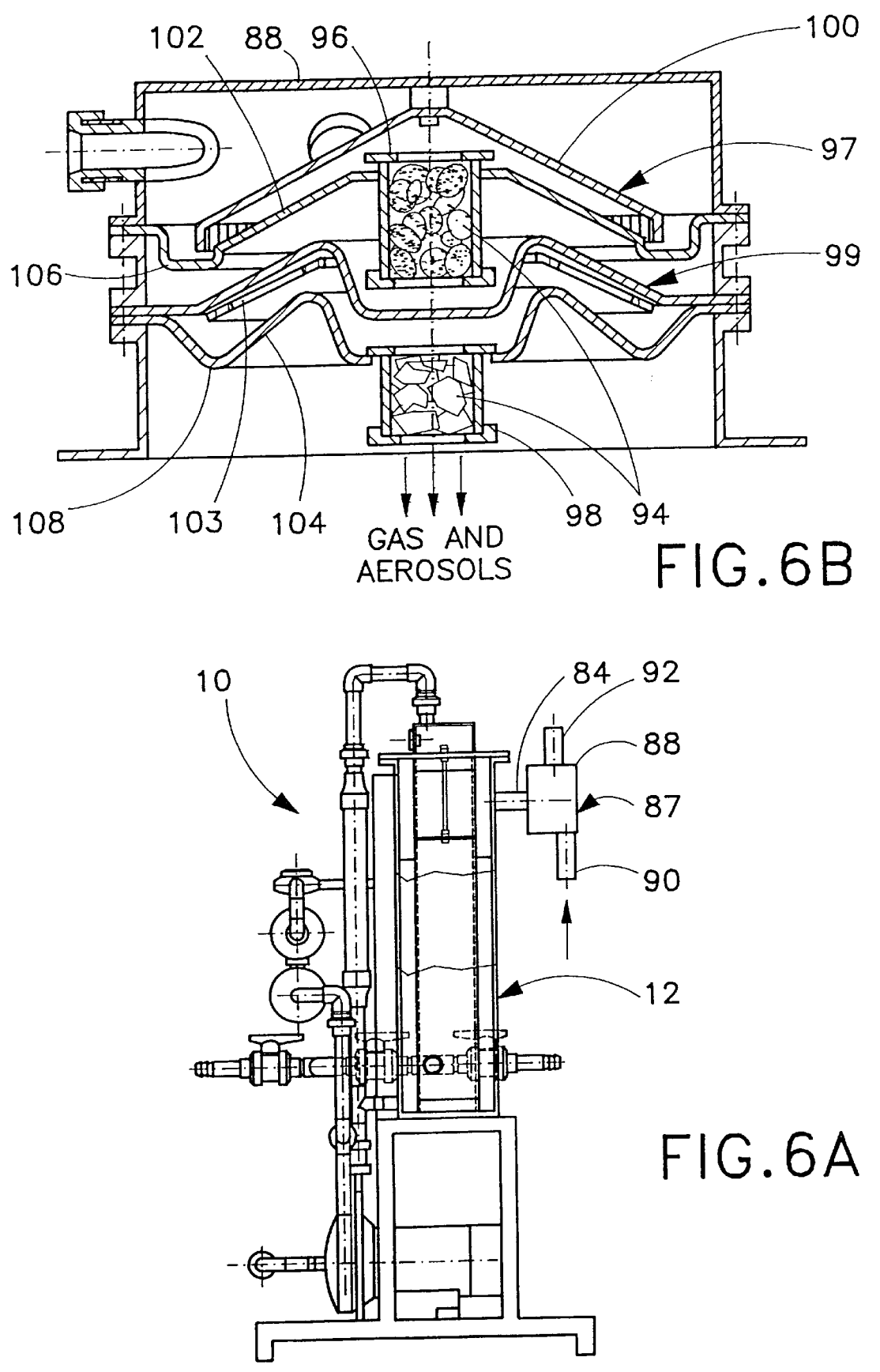

Gas and aerosol outlet ports 84, 86 are provided in the housing 12 at a location above the horizontal portion 68, 70 of the electrodes 40, 42. The ports 84, 86 are located so as to be able to remove the gases from above the action zone in a direction perpendicular to the direction of the fluid movement in the action zone. As shown in FIG. 6a, a filter assembly is generally shown at 86 in fluid communication with the outlet 84. Assembly 86 includes a housing 88 including air pressure piping 90 and vacuum creating piping 92 for extracting gases from the treatment zone within the housing 88.

The housing (88), shown enlarged in large in FIG. 6b provides a filter including alumosilicate granulated filler. More specifically, natural granulated clinoptilolite is used as a filler and indicated at (94). The filler is contained within conical settling basins 96, 98.

The gases and aerosols are guided to the cylindrical capacities 96, 98 in a tangential direction, through conical settling basins 96 98. Plates 100, 102, 103, 104 are provided to cause turbulence of the gas or aerosol through the system. Plates 102 and 104 include ring-shaped portions 106 pooling condensation of the fluids passing through the housing 88. Thusly, the system provides two filtration cylinders containing the clinoptilolite as well as a turbulent operating system.

The gases are guided to the cylindrical capacities of the filter in a tangental direction, through the conical settling basin with a vortical effect.

The assembly 86 can also contain a cloth filter for conventional filtration of air, aerosols, and fluids therethrough.

Prior to liquid entrance to the pH Balancer, liquid treatment is required or recommended in order to protect and prevent scale formation and sedimentation of hard salts on the active surface of the negative electrode (cathode); in addition the electrical dialysis process effects and causes plating of the electrode even though the heavy metals concentrations may be relatively low. Effort must be made eliminate or minimize this plating process.

The a/m plating process takes place due to the close distance between electrodes and the presence of some of the following elements in the water: Ca, Mg, K, Fe etc. The plating process is enhanced at the edges of the electrode. (The edge effect in this case is a drawback, since it is advantageous to avoid this plating process and keep the edge effect to our advantage only in the process of changing pH.) Furthermore, the surface of the titanium electrode is somewhat rough and the outstanding titanium particles tend to be plated quicker.

For all the above reasons, a pre-treatment device is intended to prevent or slow down the process of plating which takes place on the surface and edges of the electrode.

It is known that the contact between liquid and high potential metals causes a slower sedimentation process. If you prolong the time of contact sedimentation of salts or scale formation is reduced to a minimum. Therefore, the presence of the coated spheres in water causes maximal contact with water, thus eliminating scale formation. It is also known that if the place of contact between salts in liquid and coated spheres is subjected to a strong magnetic field it helps in reducing sedimentation of salts and may stop the plating of electrodes. The pre-treatment of liquid entering the pH Balancer is done to stop or slow the sedimentation of salts and the electro-chemical plating of the cathode (negative charged electrode). The pre-treatment device is designed to have the magnetic field in the center of the chamber in which the pre-treatment process occurs. The spherical material is in contact with the liquid. In this way the contact area between spheres and liquid is maximized in a given minimal chamber's volume, this whole chamber's volume being effected by the magnetic field.

Figure 7:
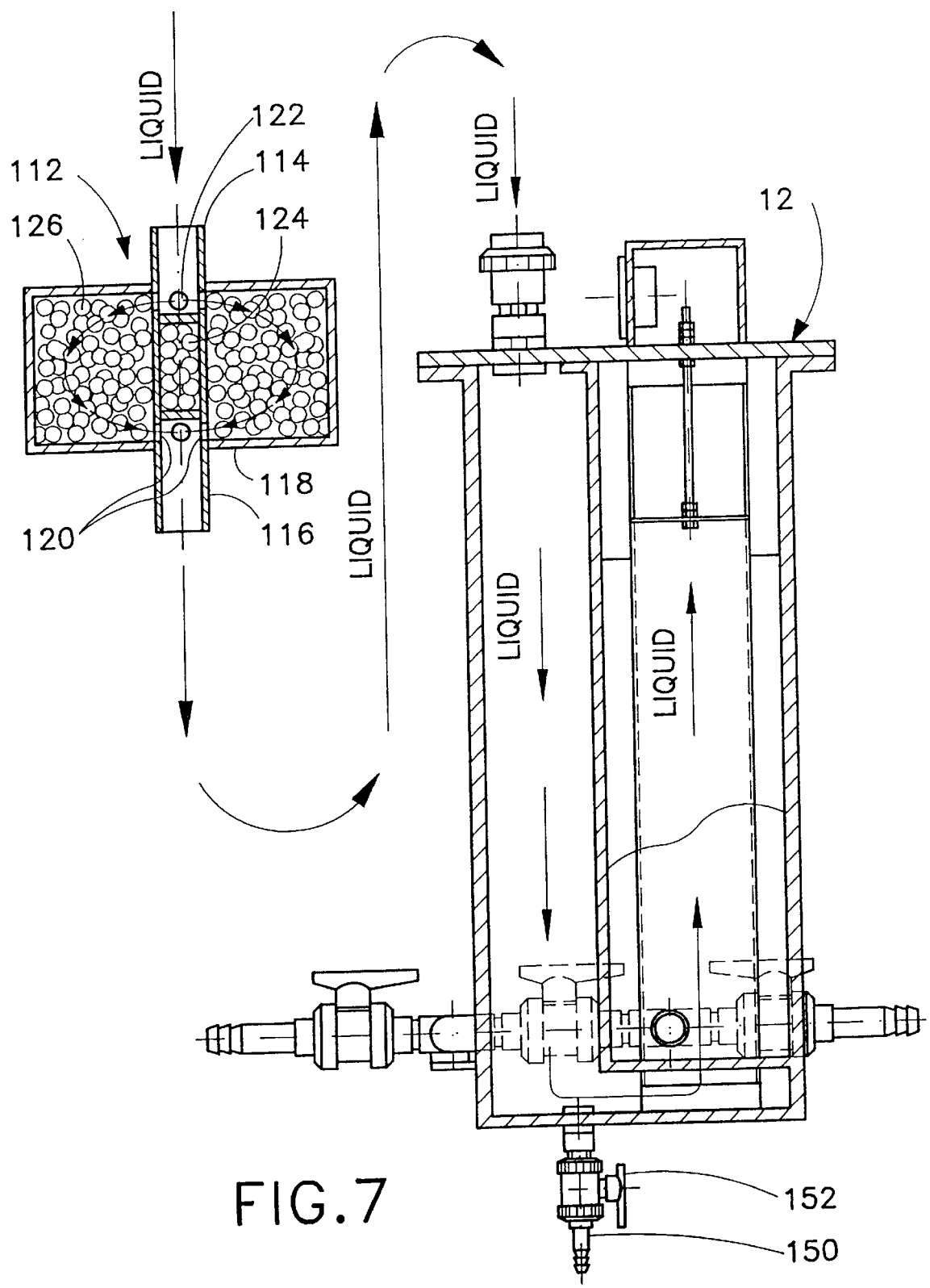
FIG. 7 is a cross-sectional view of the assembly and an enlarged cross-sectional view of a pre-filter associated therewith.

A pre-treatment system is generally shown at 112 in FIG. 7. The pretreatment system 112 is shown enlarged in FIG. 7 relative to the housing 112 that is shown. The pre-treatment system 112 includes a fluid inlet 114 and fluid outlet 116 and a central housing 118. The inlet 114 is an entrance pipe having holes 120, 122 therethrough. The pipe contains a magnetic substance in the form a magnetic particles 124 for treatment of the fluid passing therethrough 118. The housing 118 includes granules of coated ceramics 126. The granules of coated ceramic 126 can be spheres plated in various stages, such as copper plated with tin, tin then plated with copper, and copper then plated with silver. The spheres are made of porous ceramics coated with layers of copper, tin, silver and zinc. The outside layer is coated with either silver or zinc. The spheres with an outside coat of silver or zinc are mixed. The liquid flowing between spheres causes turbulence (an effect similar to liquid motion while being boiled). Due to the fact that the outside coat is silver or zinc, an electrical potential of 20 to 40 millivolts is generated. This causes a chemical balance and the following advantages are achieved:

1. No loss of energy for unwanted activities such as plating.
2. Isolation and protection of electrode's surface to prevent sedimentation and scale formation.
3. Stoppage of metal plating process of negative electrode.

This pretreatment system provides a contact-stabilization stratum of elements. While the liquid is passing through the contact stabilization stratum, that being the spherical ceramic granules, the fluid is also treated by the magnetic field.

Figure 8:
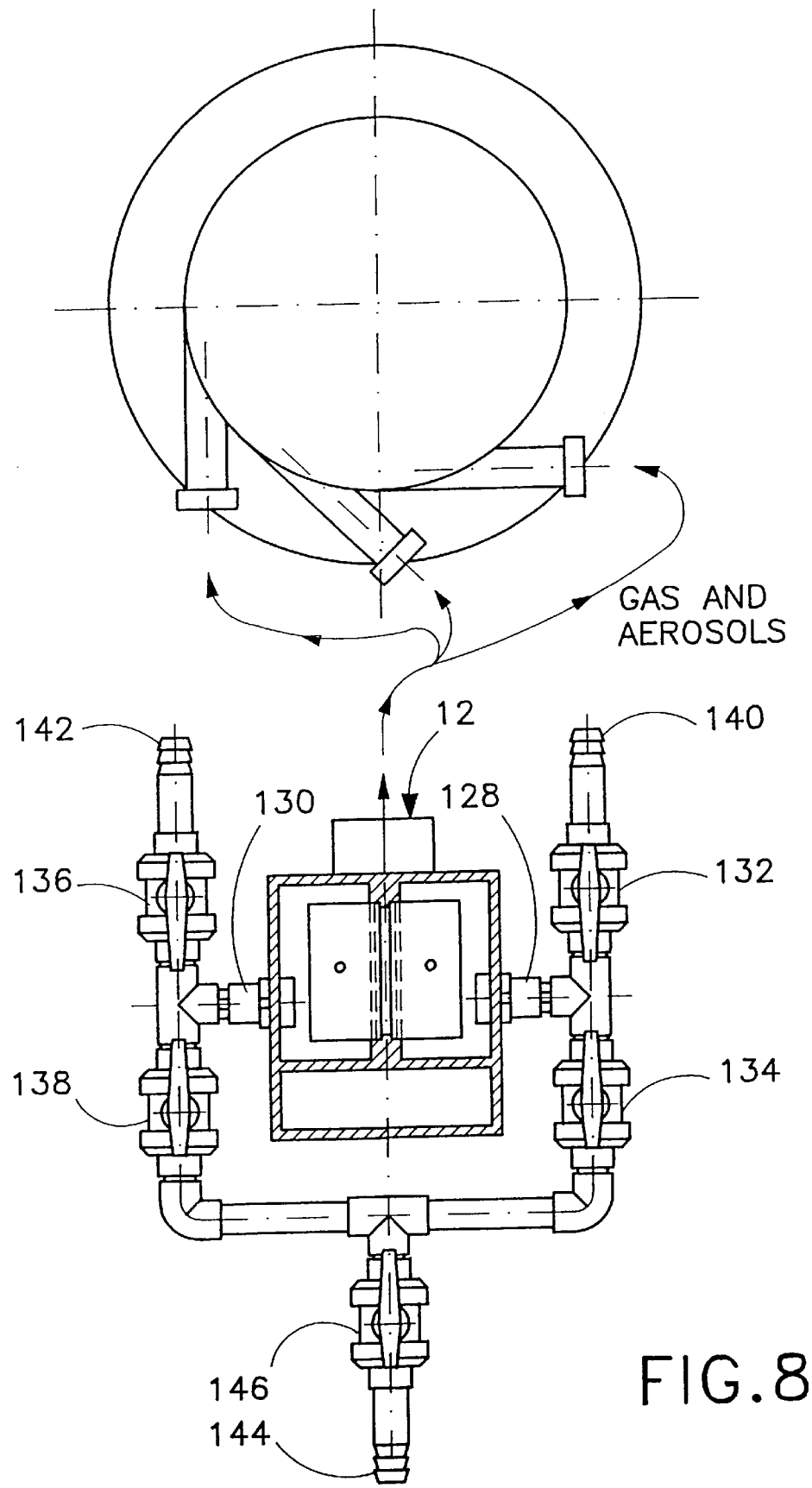
FIG. 8 is a cross-sectional view of the housing showing the outlets therefrom and outlet piping thereof.

As shown in FIG. 8, after passing over the edges 72, 74 of the electrodes 40, 42 the fluid is collected and exits through outlets 128, 130. Appropriate valving 132, 134, 136, 138 controls outlet fluid flow. The fluid can be controlled to exit separately by closing valves 134 and 138, and the opening of valves 132, 136. Alternatively, valves 132 and 136 can be closed and valves 134 and 138 opened to various degrees to provide a combined flow through outlet 144. Valve 146 controls the combined flow through valve 144 and have an on/off effect. Thusly, acidic and alkaline stabilized fluids can be removed separately through outlets 140 and 142 or combined at various ratios by controlling the valves 134, 138 for exit through outlet 144.

Based on the above, the present invention provides a novel process for adjusting the pH of aqueous flowable fluids by electrochemically adjusting the pH of an aqueous flowable fluid and then electrochemically stabilizing the adjusted pH of the fluid. The stabilizing is effected by flowing the fluid having the adjusted pH over an edge of electrodes 40, 42. More specifically, the processes is effectuated by the inlet of fluid into the system to inlet 16 by being pumped by pump 18 through mechanical filters 22, 24 and through pre-filter 112. The pre-filter 112 provides a contact stabilization stratum including the elements having active surfaces prior to the fluid entering the active zone. Additionally, the fluid is treated by a magnetic field as it is passing through the contact stabilization stratum.

The fluid enters the accumulating passage 36 and then accelerates as it rises through the action zone along the membrane 50 in between the working surfaces 60, 62 of electrodes 40, 42. In this action zone, the pH of the fluid is changed. Critically, the passage 36 and action zone act as a connected U-shaped vessel 36 wherein the passage has a greater volume than the action zone such that the fluid accelerate through the action zone.

The fluid is additionally power saturated by the fluid flowing over the top portion 68, 70 of the electrodes 40, 42 and about the current lead connectors interconnecting the electrodes 40, 42 to a power source. The fluid then flows over an edges 72, 74 of each electrode 40, 42 thereby imparting an edge effect which stabilizes the pH change of each fluid flow. At least one of the electrodes includes the extended portion 76 for providing an additional active power portion narrowly extending from the horizontal portion 68 of the electrode 40.

Preferably, there can be periodic pulse changing of the voltage and current parameters of the electrodes 40, 42 in the action zone. Also, the fluid flows between the electrodes 40, 42 in the action zone in a direction opposite to the direction of electrical potential propagation along the electrodes. Further, a pulse current lead can be alternated with a stabilized current in the electrodes 40, 42 as the fluid flows therebetween to further effectuate the effect of the system.

Aerosols and gases can be removed to the filter assembly 86 containing the alumosiliacate granulated filter. These gases are guided to a cylindrical section of the filter 86 in a trangental direction thereby producing a vortical effect. The fluid is then removed from the system through outlets 128, 130 as described below. Excess liquid can be emptied from the system through outlet 150, controlled by valve 152.

Utilizing the present invention, various fluids can be treated. For example, the present invention can be utilized to adjust the acidity of water treated by reverse osmosis, change the acidity of waste water after various galvanic processes, change the acidity in water before it is applied to industrial washing processes, change water acidity in the cooling towers of thermal power plants, boiler rooms, and other related systems, change the acidity of liquids in various technological processes in pharmaceuticals, change the acidity of liquids in various technological processes when producing cosmetics, change the acidity of liquids in various technological processes when producing synthetic detergents, change the acidity of liquids in various technological processes related to the food industry, change the acidity of liquids in laboratories, demonstrate change in acidity of liquids for training purposes in schools, and change the acidity of water used in internal combustion engines. Thusly, the present invention can be used in various systems demanding adjustment of acidity of liquids and solutions, industrial and in agriculture utilities.

The following is an example of the subject device and method in implementation. An acidity change (pH) was effected in water after its treatment in a device constructed in accordance with the present invention of reverse osmosis. Water parameters after the reverse osmosis installation were: pH4-5, conductivity-30 micro-S, temperature 20° C. influent water before treatment on the reverse osmosis device was common drinking water from water basins with general mineralization of 200 to 300 mm per liter and conductivity of about 400 micro-S, pH-7.5. The remaining parameters and concentrations were in compliance with drinking water standards. The operation schedule of the device used for the acidity change for this example were: consumption 250 liter per hour, voltage 52 V, current density 0.3A, titanium electrodes having width 20 mm and length of contact zone 300 mm. The distance between the electrodes was 6mm and distance between the electrode and membrane was 2.8 mm. The membrane was neutral and made from polypropylene fabric. After passing the inter electrode space, the water parameters were pH8.5, conductivity 29 micro-S, having a temperature of 21.5° C. and general mineralization of 25 mm per liter. Hence, there was an effective pH change and significant demineralization of the water with very little temperature change. There was also a significant decrease in conductivity.

Hence, the present invention has utility for changing the pH of various flowable aqueous fluids in various industries and agricultural situations.

What is claimed is:

1. A process for adjusting the pH of aqueous flowable fluid comprising:

electrochemically adjusting the pH of an aqueous flowable fluid; and stabilizing the adjusted pH of the fluid, the adjusting of the pH of said fluid including guiding the fluid through an action zone between two electrodes, the stabilizing of the adjusted pH including guiding the fluid over and partially around an edge located outside of said action zone and projecting into a fluid slow path extending from an outlet side of said action zone.

2. A process as in claim 1 wherein the adjusting of the pH of said fluid further includes supplying an electrical potential to each of said electrodes, the stabilizing of the adjusted pH including maintaining said edge at another potential equal to that of one of said electrodes, the stabilizing of the adjusted pH further including flowing the fluid having the adjusted pH over said edge during the maintaining of said edge at said another potential.

3. A process as in claim 2 wherein one of said electrodes has an extension located outside of said action zone, said edge being disposed on said extension, said flowing step being further defined as flowing the fluid having the adjusted pH over said extension to intensify the stabilizing of the pH of the fluid.

4. A process as in claim 3 further including the step of feeding each electrode with electrical potential of only one magnitude.

5. A process as in claim 4 wherein said step of electrochemically adjusting the pH is further defined as introducing the fluid into a chamber separated into two sub-chambers by a permeable membrane, said chamber being substantially co-extensive with said action zone, each sub-chamber containing one of said electrodes, one of said electrodes being an anode and the other being a cathode.

6. A process as in claim 5 wherein said introducing step is further defined as moving the fluid in parallel to a working surface of each electrode and conveying positive and negative electrical potential into the fluid, the membrane being disposed parallel to and symmetrical with the working surface.

7. A process as in claim 5 further including the steps of flowing the fluid into an inlet accumulating passage below the chamber, the passage having a greater volume than the chamber, and pumping the fluid from the passage up into the chamber and accelerating the fluid flow through the chamber.

8. A process as in claim 7 wherein said pumping step is further defined as supplying the fluid to the action zone via a U-shaped channel in which a volume of the fluid is divided into the two sub-chambers divided by the membrane.

9. A process as in claim 7 further including the step of additionally power saturating the fluid flow.

10. A process as in claim 9 wherein said extension includes a top portion of one of said electrodes, the other of said electrodes also having a top portion, said power saturating step being further defined as flowing the fluid over top portion of each of said electrodes and about a current lead connector interconnecting said electrodes to a power source.

11. A process as in claim 10 wherein the top portion of each electrode extends substantially horizontally, said step of flowing the fluid of the top portion of each electrode being further defined as contacting the fluid flow with the current lead connector as the fluid flow over the top portion of each electrode.

12. A process as in claim 11 wherein said power saturating step is further defined as flowing the fluid from one of the two sub-chambers over one of the electrodes having an edge at a periphery of the top portion thereof and flowing the fluid from the other sub-chamber over an electrode including an additional active portion downwardly extending from the top portion thereof.

13. A process as in claim 12, further including the step of retrieving the fluid from the action zone into vertically extending outlet channels, said additional active portion extending into one of the outlet channels.

14. A process as in claim 12 wherein a bottom portion of the additional active portion in inwardly bent towards the action zone, the power saturating step being further defined as flowing the fluid over an edge or end of one of the top portions and then contacting the fluid with an edge of the additional active portion.

15. A process as in claim 14 including the further step of further changing the fluid pH by exposing the fluid to a portion of the current lead having an additional active portion which is charged with positive or negative potential.

16. A process as in claim 15 including the further step of removing gases from the action zone in a direction perpendicular to the direction of fluid flow in the action zone.

17. A process as in claim 16 wherein said removing step is further defined by guiding compressed fluid to ejectors located opposite to one another on both sides of an upper part of the action zone.

18. A process as in claim 17 further including the step of conveying the removed gases to a filter containing alumosilicate granulated filler.

19. A process as in claim 18 further including the step of guiding the removed gas to a cylindrical section of the filter in a tangential direction and producing a vortical effect.

20. A process as in claim 15 further including the step of supplying a direct current to the electrodes.

21. A process as in claim 20 further including the step of periodically pulse changing the voltage and current parameters of the electrodes in the action zone.

22. A process as in claim 5 further including the step of passing the fluid through a contact-stabilization stratum including elements having active surfaces prior to the fluid entering the action zone.

23. A process in claim 22 wherein said passing step is further defined as contacting the fluid with spherical ceramic parts coated with metals possessing an increased electrode potential.

24. A process as in claim 23 further including the step of treating the fluid by a magnetic field as it passes through the contact-stabilization stratum.

25. A process as in claim 5 further including the steps of supplying the fluid to the chamber between the electrodes in the action zone in a direction opposite to the direction of electrical potential propagation along the electrodes.

26. A process as in claim 25 further including the step of alternating a pulse current lead with a stabilized current in the electrodes as the fluid flows therebetween.

27. A process as in claim 5 further including the step of neutralizing the membrane between the electrodes.

28. A process for adjusting the pH of an aqueous flowable fluid by:

supplying a fluid through a U-shaped channel having an inlet accumulating passage in an inlet leg and an action zone in an outlet leg;

dividing the fluid into two branches in the action zone between two electrodes wherein the action zone has a smaller volume relative to the inlet accumulating passage; and accelerating the fluid flow from the inlet accumulating passage through the action zone so that the fluid flowing through the action zone has a velocity substantially greater than the velocity of the fluid flowing through the inlet accumulating passage.

29. A device or adjusting the pH of an aqueous flowable fluid, said device comprising:

a pair of electrodes spaced from one another to define an action zone for electrochemical adjusting the pH of the fluids; and stabilizing means for stabilizing the adjusted pH of the fluid, said stabilizing means including an edge located outside of said action zone and projecting into a fluid flow path extending from an outlet side of said action zone.

30. The device as in claim 29 wherein said edge is a first edge and said action zone includes a chamber separated into two sub-chambers by a permeable membrane extending between said electrodes, each of said electrodes having a respective extension located outside of said action zone, each of the extensions having a peripheral edge over which fluid flows after passing through said action zone, said first edge being one of said peripheral edges.

31. A device as in claim 30 wherein said edges are shaped for ensuring hydrodynamic contact of all of the fluid with said edges as liquid flows off of said electrodes.

32. A device as in claim 31 wherein each of said electrodes includes a vertically extending portion along said active zone, said extensions each including a substantially horizontal portion extending from a top end of the respective vertically extending portion, the horizontal portions extending opposite directions relative to one another.

33. A device as in claim 32 wherein at least one of said extensions includes a substantially downwardly extending additional portion further stabilizing the adjusted pH of the fluid.

34. A device as in claim 33 wherein said additional portion is curved inwardly toward the vertically extending portions.

35. A device as in claim 34 further including additional power saturation means for additionally power saturating the fluid flow.

36. A device as in claim 35 wherein said additional power saturating means includes a connector lead connector interconnecting each of the electrodes to a power source.

37. A device as in claim 36 wherein the connectors are stream-lined relative to the fluid flow and are non-insulated and made of the same material as said electrodes.

38. A device as in claim 30 wherein each of said electrodes includes a working surface parallel to the other electode, said membrane being disposed parallel to and symmetric with said working surfaces, thereby defining said action zone.

39. A device as in claim 35 further including an inlet accumulating passage below and in fluid communication with said chamber, said passage having a larger volume relative to a volume of said chamber so that fluid flow from said passage into said chamber accelerates the fluid as the fluid rises through said action zone.

40. A device as in claim 30 wherein said electrodes are spaced 4 to 6 mm apart through said active zone, said membrane extending between said electrodes within said action zone.

41. A device as in claim 39 wherein each electrode includes a peripheral portion having a fold therein angled 30° to 45° relative to said working surface of said respective electrode.

42. A device for adjusting the pH of an aqueous flowable fluid, said device comprising:
an inlet; and
a U-shaped channel in fluid communication with said inlet, said U-shaped channel including an inlet accumulating passage in fluid communication with an action zone between two spaced electrodes wherein said action zone has a smaller volume relative to said passage for accelerating fluid flow from said passage through said action zone.

43. A process for adjusting the pH of an aqueous flowable fluid, comprising:
supplying a fluid through a channel to an inlet of an action zone between two electrodes; and
accelerating the fluid flow from said inlet through said action zone so that the fluid flowing through the action zone has a velocity substantially greater than the velocity of the fluid flowing through said channel.

44. A process as in claim 43 wherein said electrodes are vertically oriented, said inlet being disposed at a lower end of said action zone, the accelerating of the fluid flow including directing the fluid flow in a vertically upward direction.

45. A process as in claim 44 wherein a membrane is disposed in said action zone between said electrodes to divide said action zone into two chambers, further comprising dividing the fluid flow into two portions and directing one such portion into one of said two chambers and the other such portion into the other of said two chambers.

46. A process as in claim 44 wherein at least one of said electrodes has a horizontally oriented extension at an upper end, further comprising directing fluid flow at an outlet of said action zone substantially horizontally over said horizontally oriented extension.

47. A device for adjusting the pH of an aqueous flowable fluid, said device comprising:
a pair of electrodes defining an action zone for electrochemically adjusting the pH of the fluid, at least one of said electrodes having a main body extending parallel to the other electrode and further having an extension integral with said main body and oriented at a substantial angle relative thereto, said extension being located outside of said action zone, said extension partially defining a flow path from an outlet of said action zone; and
means operatively connected to said electrodes for supplying said electrodes with a potential difference and for maintaining said extension at a common potential with said main body.

48. A device as in claim 47 wherein said main body is vertically oriented and at least a portion of said extension is horizontally oriented.

49. A device as in claim 48 wherein said extension includes a downwardly extending portion connected to the horizontally oriented portion at an end thereof opposite said main body.

50. A process for adjusting the pH of an aqueous flowable fluid, comprising:
supplying a fluid through a channel to an inlet of an action zone between two electrodes, said action zone having at least two sub-chambers; and
dividing the fluid into two branches in the action zone between the two electrodes, one of the branches flowing through one of said sub-chambers, the other of said branches flowing though the other of said sub-chambers.

* * * * *